(12) United States Patent
Bähr et al.

(10) Patent No.: US 10,727,714 B2
(45) Date of Patent: Jul. 28, 2020

(54) MACHINE COMPONENT OF AN ELECTRIC MACHINE AND METHOD FOR PRODUCTION THEREOF

(71) Applicant: SIEMENS AKTIENGESELLSCHAFT, München (DE)

(72) Inventors: Hubertus Bähr, Bad Königshofen (DE); Rainer Eckert, Herschfeld (DE); Martin Holzheimer, Hollstadt (DE); Benjamin Volkmuth, Sulzthal (DE)

(73) Assignee: Siemens Aktiengesellschaft, Munich (DE)

( * ) Notice: Subject to any disclaimer, the term of this patent is extended or adjusted under 35 U.S.C. 154(b) by 910 days.

(21) Appl. No.: 15/083,900

(22) Filed: Mar. 29, 2016

(65) Prior Publication Data
US 2016/0294244 A1 Oct. 6, 2016

(30) Foreign Application Priority Data

Mar. 30, 2015 (EP) .................................. 15161674

(51) Int. Cl.
*H02K 5/08* (2006.01)
*H02K 5/15* (2006.01)
(Continued)

(52) U.S. Cl.
CPC ............... *H02K 5/08* (2013.01); *B22D 17/00* (2013.01); *B22D 17/24* (2013.01); *B22D 19/00* (2013.01);
(Continued)

(58) Field of Classification Search
CPC .... F16C 35/067; F16C 35/077; F16C 19/525; F16C 2380/26; H02K 5/00; H02K 5/02;
(Continued)

(56) References Cited

U.S. PATENT DOCUMENTS 7,202,582 B2 4/2007 Eckert et al.
7,692,356 B2 4/2010 Bott et al.
(Continued)

FOREIGN PATENT DOCUMENTS

CN 103366050 A 10/2013
DE 102004033745 A1 1/2006
(Continued)

OTHER PUBLICATIONS

Yamada Yoshio, Motor, Jul. 18, 1990, Matsushita Electric, JP
Sommer Rudolf, Electric Motor, May 19, 1999, ATB Austria, EP 0917274 (English Machine Translation) (Year: 1999).* 02-184239 (English Machine Translation) (Year: 1990).*

*Primary Examiner* — Alfonso Perez Borroto
*Assistant Examiner* — Alexander A Singh
(74) *Attorney, Agent, or Firm* — Henry M. Feiereisen LLC

(57) ABSTRACT

A machine component of an electric machine includes a metal base body and a sealing element, arranged on the base body, for thermally decoupling the machine component and a unit abutting it. The base body is manufactured by pressure die-casting. The sealing element is made from plastic and is connected to the base body in a form-fit manner during the pressure die-casting of the base body.

12 Claims, 1 Drawing Sheet

(51) Int. Cl.
  *B22D 17/24* (2006.01)
  *B22D 19/00* (2006.01)
  *H02K 15/14* (2006.01)
  *B22D 19/04* (2006.01)
  *B22D 17/00* (2006.01)
  *B22D 21/00* (2006.01)
  *H02K 5/02* (2006.01)
  *H02K 5/06* (2006.01)

(52) U.S. Cl.
  CPC ........... *B22D 19/04* (2013.01); *B22D 21/007* (2013.01); *H02K 5/02* (2013.01); *H02K 5/06* (2013.01); *H02K 5/15* (2013.01); *H02K 15/14* (2013.01)

(58) Field of Classification Search
  CPC .. H02K 5/04; H02K 5/06; H02K 5/08; H02K 5/15; H02K 5/16; H02K 5/161; H02K 5/163; H02K 5/165; H02K 5/167; H02K 5/1672; H02K 5/1675; H02K 5/1677; H02K 5/173; H02K 5/1732; H02K 5/1735; H02K 5/1737; H02K 11/00; H02K 11/21; H02K 15/14; B22D 21/007; B22D 17/24; B22D 17/00; B22D 19/00; B22D 19/04
  USPC .......................... 310/89, 90, 68 B, 68 C, 91
  See application file for complete search history.

(56) References Cited

U.S. PATENT DOCUMENTS

| | | | |
|---|---|---|---|
| 7,712,367 | B2 | 5/2010 | Eckert et al. |
| 7,737,585 | B2 | 6/2010 | Bähr et al. |
| 7,965,005 | B2 | 6/2011 | Schmidt et al. |
| 8,072,103 | B2 | 12/2011 | Eckert et al. |
| 8,159,099 | B2 | 4/2012 | Duempert et al. |
| 8,188,628 | B2 | 5/2012 | Bähr et al. |
| 2002/0023611 | A1 | 2/2002 | Hara |
| 2008/0290761 | A1 | 11/2008 | Eckert et al. |
| 2008/0303360 | A1* | 12/2008 | Vinson ................ H02K 5/1732 310/59 |
| 2010/0066191 | A1 | 3/2010 | Bähr et al. |
| 2010/0213798 | A1* | 8/2010 | Yuan ....................... G01D 1/00 310/68 B |
| 2010/0244600 | A1 | 9/2010 | Then et al. |
| 2012/0146435 | A1 | 6/2012 | Bott et al. |
| 2016/0065011 | A1 | 3/2016 | Schneider et al. |
| 2016/0079832 | A1 | 3/2016 | Volkmuth et al. |

FOREIGN PATENT DOCUMENTS

| | | |
|---|---|---|
| EP | 0917274 A1 * | 5/1999 |
| EP | 1075920 A1 | 2/2001 |
| JP | 02184239 A1 * | 7/1990 |

* cited by examiner

MACHINE COMPONENT OF AN ELECTRIC MACHINE AND METHOD FOR PRODUCTION THEREOF

CROSS-REFERENCES TO RELATED APPLICATIONS

This application claims the priority of European Patent Application, Serial No. 15161674.5, filed Mar. 30, 2015, pursuant to 35 U.S.C. 119(a)-(d), the disclosure of which is incorporated herein by reference in its entirety as if fully set forth herein.

BACKGROUND OF THE INVENTION

The present invention relates to a machine component of an electric machine, and to method for production of such a machine component.

The following discussion of related art is provided to assist the reader in understanding the advantages of the invention, and is not to be construed as an admission that this related art is prior art to this invention.

Core-and-coil assemblies of electric machines, for example core-and-coil assemblies of servo motors, often become very hot during operation. Other components of electric machines, in particular sensors, must not be exposed to temperatures which exceed specific maximum temperatures, since otherwise they will be damaged or destroyed. Hence it is often necessary thermally to decouple the core-and-coil assemblies from other components of electric machines. In particular, the mostly metal housings of electric machines and sensors must frequently be thermally decoupled from one another. To thermally decouple such housings, use is made, for example, of insulating disks which are glued and/or screwed at defined positions of a housing, for example on bearing shields of electric machines.

It would be desirable and advantageous to obviate prior art shortcomings.

SUMMARY OF THE INVENTION

According to one aspect of the present invention, a machine component of an electric machine includes a metal base body made by a pressure die-casting process, and a sealing element arranged on the base body and configured to thermally decouple the machine component and an abutting unit, said sealing element being made from plastic and connected in form-fit manner to the base body as the base body undergoes the pressure die-casting process.

Such a machine component therefore has a metal base body which is manufactured by pressure die-casting, wherein during the pressure die-casting of the base body a sealing element made of a plastic is simultaneously connected in form-fit manner to the base body in order to thermally decouple the machine component and a unit abutting it. Such a machine component can be manufactured in a particular simple manner and inexpensively, since the manufacture of the base body and its connection to the sealing element take place simultaneously using pressure die-casting. In particular, the need to connect the sealing element separately to the base body by gluing and/or screwing is advantageously eliminated.

According to another advantageous feature of the present invention, the sealing element can have sealing surfaces which abut the base body and which can each have at least one depression having a labyrinth-shaped configuration. Advantageously, at least one of the sealing surfaces can adjoin a partial surface of the sealing element, which partial surface can form part of an outer surface of the machine component.

Sealing surfaces with depressions in the form of a labyrinth, advantageously improve the form-fit connection of the sealing element to the base body and advantageously reduce in the vicinity of the sealing surfaces turbulent flows which result in scaling and outgassing of the sealing surfaces and so jeopardize the tightness of the connection between the sealing element and the base body. Sealing surfaces which are attached to a partial surface of the sealing element which forms part of the outer surface of the machine component are particularly advantageous, since during pressure die-casting, they are located in the vicinity of surface regions of the metal molten mass used during pressure die-casting and thus in regions in which the molten mass cools particularly quickly, so that scaling and outgassing of the sealing surfaces due to lengthy contact with a very hot molten mass is advantageously reduced.

According to another advantageous feature of the present invention, the base body can be made from aluminum or an aluminum alloy. This feature of the invention advantageously takes into consideration the fact that aluminum and aluminum alloys are used particularly frequently as material for manufacturing machine components of electric machines using pressure die-casting.

According to another advantageous feature of the present invention, the sealing element can be manufactured from a thermosetting material. Because of their high temperature stability, thermosetting materials are particularly advantageously suitable for manufacturing sealing elements which come into contact with metal molten mass at a high temperature during pressure die-casting.

According to another advantageous feature of the present invention, the machine component can be constructed in the form of a bearing shield of the electric machine. This feature of the invention advantageously takes into consideration the fact that bearing shields are particularly suitable for having other units such as sensors arranged on them.

According to another advantageous feature of the present invention, the sealing element can have a substantially disk-shaped configuration. This feature of the invention advantageously enables an extensive thermal decoupling of the machine component and a unit abutting it.

According to another aspect of the present invention, a method for manufacturing a machine component includes placing a sealing element into a die-casting mold, so that a partial surface of the sealing element abuts the die-casting mold, and filling the die-casting mold with a metal molten mass to pressure die-cast a base body and thereby connect the sealing element in form-fit manner to the base body.

A method according to the invention advantageously enables the simultaneous manufacture, already referred to above, of the base body and its connection to the sealing element by pressure die-casting.

According to another advantageous feature of the present invention, the sealing element can be manufactured such that a surface thereof defines sealing surfaces which each can have at least one depression having a labyrinth-shaped configuration and which during pressure die-casting of the base body are encapsulated with the metal molten mass. At least one of the sealing surfaces can be attached to the partial surface of the sealing element abutting the die-casting mold during the pressure die-casting.

According to another advantageous feature of the present invention, the sealing element can be designed and positioned in the die-casting mold such that the metal molten mass with which the die-casting mold is filled for pressure die-casting the base body cools more quickly in regions of the sealing surfaces of the sealing element than in other regions within the die-casting mold.

According to another advantageous feature of the present invention, the sealing element can be designed and positioned in the die-casting mold such that turbulent flows of the metal molten mass with which the die-casting mold is filled for pressure die-casting the base body are reduced in regions of the sealing surfaces of the sealing element.

As already described above, these features of the invention reduce scaling and outgassing of the sealing surfaces by arranging the sealing surfaces in regions in which the metal molten mass cools quickly during pressure die-casting and turbulent flows are suppressed. This means that advantageously the tightness of the connection between the sealing element and the base body is increased.

According to another advantageous feature of the present invention, the metal molten mass with which the die-casting mold is filled to pressure die-cast the base body can be an aluminum alloy at a temperature of approximately 700 degrees Celsius. This feature again advantageously takes into consideration the fact that aluminum alloys are used particularly frequently as material for manufacturing machine components of electric machines using pressure die-casting.

According to yet another aspect of the present invention, an electric machine includes a machine component including a metal base body made by a pressure die-casting process, and a sealing element arranged on the base body and configured to thermally decouple the machine component and an abutting unit, said sealing element being made from plastic and connected in form-fit manner to the base body as the base body undergoes the pressure die-casting process; and a unit abutting the sealing element of the machine component.

According to another advantageous feature of the present invention, the machine component can be a bearing shield, and the unit can be a sensor housing of a sensor.

Because the unit abuts the sealing element of the machine component, the unit is thermally decoupled by the sealing element from the base body of the machine component. In particular, when the machine component is a bearing shield and the unit abutting its sealing element is a sensor housing of a sensor, the risk of the sensor overheating as a result of coming into contact with the base body of the machine component is thereby advantageously reduced. This is in particular advantageous when the electric machine is embodied as a servo motor, since the core-and-coil assemblies of servo motors often become very hot in operation.

At the same time, the machine component is advantageously sealed by the sealing element against penetration of liquids. Such liquids are for example jetting water or lubricants to which e.g. an electric machine arranged in or on a cutting machine, e.g. a milling machine, is exposed. Thanks to an inventive sealing element protection, classes up to the so-called IP codes (IP=International Protection) IPX5 (protection against jetting water) and even IPX7 (protection against the effects of temporary immersion in water), in particular IP67 (total protection against dust ingress and protection against the effects of temporary immersion in water) can be achieved.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
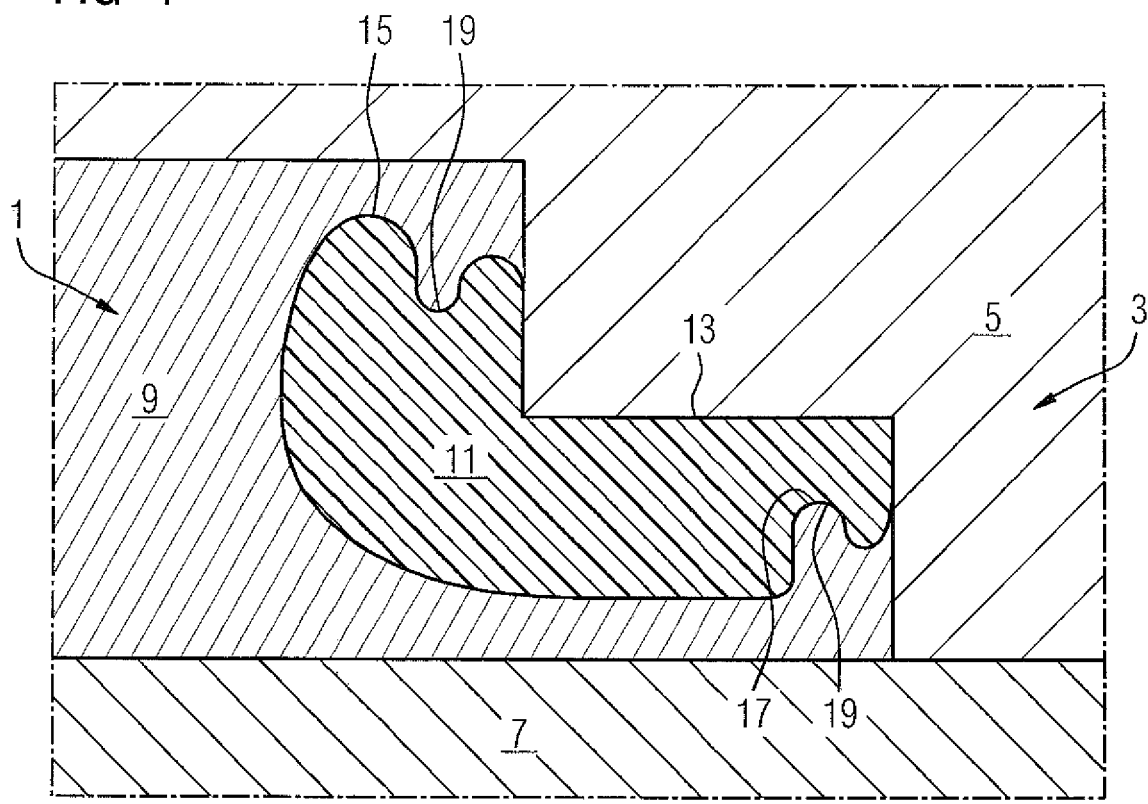
FIG. 1 is a sectional view of a machine component according to the present invention for application is an electric machine.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 2:
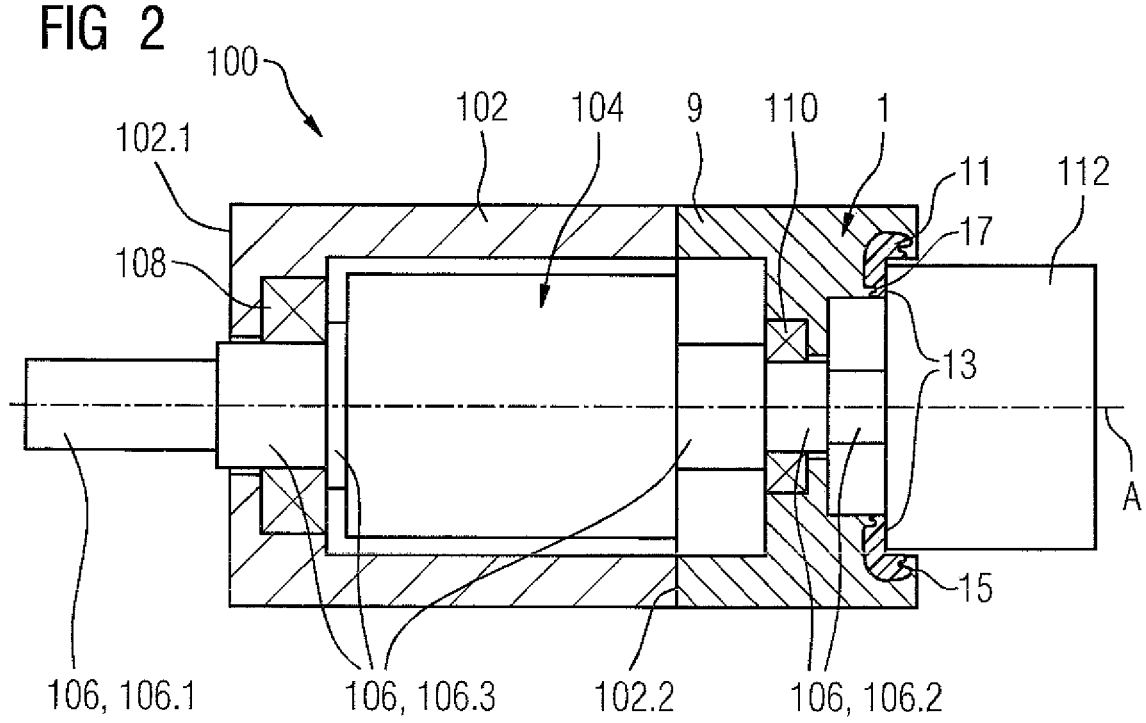
FIG. 2 is a partially sectional side view of an electric machine.

Turning now to the drawing, and in particular to FIG. 1, there is shown a sectional view of a machine component according to the present invention, generally designated reference numeral 1, for application is an electric machine 100 (see FIG. 2). The machine component 1 is located in a die-casting mold 3 which is used to manufacture the machine component 1 and which includes a first die-casting mold part 5 and a second die-casting mold part 7. In FIG. 1 only sections of the machine component 1 and the die-casting mold parts 5, 7 are illustrated for sake of simplicity.

The machine component 1 includes a metal base body 9 and a sealing element 11, arranged on the base body 9 and manufactured from a plastic, for thermally decoupling the machine component 1 and a unit 112 abutting it (see FIG. 2). The machine component 1 is, for example, a bearing shield of the electric machine 100 and the sealing element 11 is, for example, designed to be essentially disk-shaped for thermally decoupling the machine component 1 and a sensor housing of a sensor abutting it.

Advantageously, the sealing element 11 is manufactured from a thermosetting material and the base body 9 is advantageously made from aluminum or an aluminum alloy.

The base body 9 is produced by pressure die-casting in the die-casting mold 3, with the sealing element 11 being simultaneously connected in form-fit manner to the base body 9. To this end, the two die-casting mold parts 5, 7 are joined together to form the die-casting mold 3 and the sealing element 11 is placed into the die-casting mold 3, so that a partial surface 13 of the sealing element 11 abuts the die-casting mold 3. Then the die-casting mold 3 for die-casting the base body 9 is filled with a metal molten mass, for example with an aluminum alloy at a temperature of approximately 700 degrees Celsius, wherein the region of the surface of the sealing element 11 not abutting the die-casting mold 3 is encapsulated by the metal molten mass.

Once the metal molten mass has cooled and hardened, the two die-casting mold parts 5, 7 are separated from one another and the machine component 1 is removed from the die-casting mold 3. The partial surface 13 of the sealing element 11 that abuts the die-casting mold 3 during the pressure die-casting forms a part of the outer surface of the machine component 1. The remaining region of the surface of the sealing element 11 abuts the base body 9.

The surface of the sealing element 11 has sealing surfaces 15, 17 which are each attached to an end region of the partial surface 13 of the sealing element 11 and during the pressure die-casting of the base body 9 are encapsulated with metal molten mass. Each sealing surface 15, 17 has at least one depression 19 in the form of a labyrinth, which fills with metal molten mass during the pressure die-casting of the base body 9. The sealing element 11 is designed such that, and positioned in the die-cast molding 3 such that, the sealing surfaces 15, 17 are located close to the inner surface of the die-casting mold 3, so that in the regions of the sealing surfaces 15, 17 of the sealing element 11 the metal molten mass cools more quickly than in other regions within the die-casting mold 3, and turbulent flows of the metal molten mass are reduced in the regions of the sealing surfaces 15, 17.

Overall the sealing element 11 is designed such that only a small amount of scaling and outgassing of its surface occurs during the encapsulation with the metal molten mass.

Where necessary, the base body 9 is reworked after the pressure die-casting and hardening of the metal molten mass so that a contact surface to a unit 112 which is to abut the machine component 1 is reduced.

FIG. 2 shows schematically a partially sectional side view of the electric machine 100, which may, for example, be designed as a servo motor.

The electric machine 100 includes a machine housing 102 designed as a so-called pot housing, a rotor 104 with a rotor shaft 106, a machine component designed as a bearing shield with a metal base body 9 and a sealing element 11, bearings 108, 110 for supporting the rotor shaft 106, a unit 112 which abuts the sealing element 11 and is designed as a sensor housing of a sensor, and a stator (not visible in FIG. 2) which is arranged around the rotor 104 in the machine housing 102. The machine housing 102, the machine component 1 and the bearings 108, 110 are shown in a sectional view.

A longitudinal axis A of the rotor shaft 106 defines an axial direction. The rotor shaft 106 has a first end section 106.1, a second end section 106.2 and a central section 106.3 lying between the two end sections 106.1, 106.2. The central section 106.3 runs through the machine housing 102. The first end section 106.1 runs outside the machine housing 102 on the side of a first axial end 102.1 of the machine housing 102. The second end section 106.2 runs outside the machine housing 102 on the side of a second axial end 102.2 of the machine housing 102 lying opposite the first axial end 102.1.

The machine component 1 is axially attached to the second axial end 102.2 of the machine housing 102, is connected thereto and surrounds an end of the central section 106.3 of the rotor shaft 106 brought out from the second axial end 102.2 of the machine housing 102 and the second end section 106.2 of the rotor shaft 106 which is attached to this.

The central section 106.3 of the rotor shaft 106 is supported in the region of the first axial end 102.1 of the machine housing 102 in a first bearing 108 supported by the machine housing 102. The second end section 106.2 of the rotor shaft 106 is supported in a second bearing 110 which is supported by the base body 9 of the machine component 1. The bearings 108, 110 are for example each designed as a ball bearing.

The sealing element 11 is designed to be annular and runs around the axial direction in the region of an axial end of the machine component 1 facing away from the machine housing 102, so that a partial region of its partial surface 13 forms a part, standing perpendicular to the axial direction, of the outer surface of the machine component 1. The unit 112 abuts this partial region of the partial surface 13, without otherwise abutting the machine component 1 and in particular its base body 9. Because of the sealing element 11 the base body 9 and the unit 112 are thus thermally decoupled.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A machine component of an electric machine, comprising:
    a metal base body made by a pressure die-casting process; and
    a sealing element arranged on the metal base body and configured to thermally decouple the machine component and an abutting unit, said sealing element being made from plastic and connected in form-fit manner to the metal base body as the metal base body undergoes the pressure die-casting process,
    wherein the sealing element has sealing surfaces each extending in an axial direction and each directly abutting the metal base body, each said sealing surface having at least one depression extending in the axial direction and having a labyrinth-shaped configuration,
    wherein each of the sealing surfaces directly adjoins a partial surface of the sealing element, which partial surface forms part of an outer surface of the machine component,
    wherein the sealing element is encapsulated by the metal base body except at the partial surface,
    wherein the partial surface consists of a first surface extending in the axial direction directly adjoining a second surface extending in a radial direction.

2. The machine component of claim 1, wherein the metal base body is made from aluminum or an aluminum alloy.

3. The machine component of claim 1, wherein the sealing element is made manufactured from a thermosetting material.

4. The machine component of claim 1, constructed in the form of a bearing shield of the electric machine.

5. The machine component of claim 1, wherein the sealing element has a substantially disk-shaped configuration.

6. A method for manufacturing a machine component, comprising:
    placing a sealing element into a die-casting mold, so that a partial surface of the sealing element abuts the die-casting mold; and
    filling the die-casting mold with a metal molten mass to pressure die-cast a base body and thereby connect the sealing element in form-fit manner to the base body,
    manufacturing the sealing element such that a surface thereof defines sealing surfaces each extending in an axial direction and each directly abutting the base body and which have each at least one depression extending in the axial direction and having a labyrinth-shaped configuration and which during pressure die-casting of the base body are encapsulated with the metal molten mass, wherein each of the sealing surfaces directly adjoins the partial surface of the sealing element, which partial surface forms part of an outer surface of the machine component, wherein the sealing element is encapsulated by the metal base body except at the partial surface, wherein the partial surface consists of a first, surface extending in the axial direction directly adjoining a second surface extending in a radial direction.

7. The method of claim 6, wherein each of the sealing surfaces is attached to the partial surface of the sealing element abutting the die-casting mold during the pressure die-casting.

8. The method of claim 6, wherein the sealing element is designed and positioned in the die-casting mold such that the metal molten mass with which the die-casting mold is filled for pressure die-casting the base body cools more quickly in regions of the sealing surfaces of the sealing element than in other regions within the die-casting mold.

9. The method of claim 6, wherein the sealing element is designed and positioned in the die-casting mold such that turbulent flows of the metal molten mass with which the die-casting mold is filled for pressure die-casting the base body are reduced in regions of the sealing surfaces of the sealing element.

10. The method of claim 6, wherein the metal molten mass with which the die-casting mold is filled to pressure die-cast the base body is an aluminum alloy at a temperature of approximately 700 degrees Celsius.

11. An electric machine, comprising:
a machine component comprising a metal base body made by a pressure die-casting process, and a sealing element arranged on the metal base body and configured to thermally decouple the machine component and an abutting unit, said sealing element being made from plastic and connected in form-fit manner to the metal base body as the metal base body undergoes the pressure die-casting process; and a unit abutting the sealing element of the machine component, wherein the sealing element has sealing surfaces each extending in an axial direction and each directly abutting the metal base body, each said sealing surface having at least one depression extending in the axial direction and having a labyrinth-shaped configuration, wherein each of the sealing surfaces adjoins a partial surface of the sealing element, which partial surface extends in the axial direction and a radial direction and forms part of an outer surface of the machine component, wherein the sealing element is encapsulated by the metal base body except at the partial surface, wherein the unit abuts only the radial direction of the partial surface.

12. The electric machine of claim 11, wherein the machine component is a bearing shield, said unit being a sensor housing of a sensor.

* * * * *